US012636910B2

(12) United States Patent
Schaaf

(10) Patent No.: US 12,636,910 B2
(45) Date of Patent: May 26, 2026

(54) CONTACT-FREE WHEEL BEARING PRE-SEAL AND WHEEL BEARING ARRANGEMENT WITH SUCH A PRE-SEAL

(71) Applicant: Volkswagen Aktiengesellschaft, Wolfsburg (DE)

(72) Inventor: Gregor Schaaf, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 140 days.

(21) Appl. No.: 18/667,074

(22) Filed: May 17, 2024

(65) Prior Publication Data

US 2024/0383276 A1     Nov. 21, 2024

(30) Foreign Application Priority Data

May 17, 2023     (DE) ..................... 10 2023 204 602.4

(51) Int. Cl.
B60B 27/00      (2006.01)
F16C 19/18      (2006.01)
F16C 33/80      (2006.01)
F16J 15/44      (2006.01)
F16J 15/447     (2006.01)

(52) U.S. Cl.
CPC .......... B60B 27/0073 (2013.01); F16C 33/80 (2013.01); F16J 15/4472 (2013.01); F16J 15/4476 (2013.01); B60B 27/0005 (2013.01); F16C 19/186 (2013.01); F16C 2326/02 (2013.01)

(58) Field of Classification Search
CPC .... F16C 19/186; F16C 33/7886; F16C 33/80; F16C 33/805; F16C 2326/02; F16J 15/447; F16J 15/4472; F16J 15/4476; B60B 27/0005; B60B 27/0073; B60B 2900/5112; B60B 2900/5114
See application file for complete search history.

(56) References Cited

U.S. PATENT DOCUMENTS 2,188,857 A      1/1940  Chievitz
4,799,808 A      1/1989  Otto
(Continued)

FOREIGN PATENT DOCUMENTS

DE            3886850 T2      4/1994
DE           69104823 T2      3/1995
(Continued)

*Primary Examiner* — Phillip A Johnson
(74) *Attorney, Agent, or Firm* — Laurence A. Greenberg; Werner H. Stemer; Ralph E. Locher

(57) ABSTRACT
A contact-free wheel bearing pre-seal between a wheel carrier, on the one hand, and a wheel hub, a wheel bearing, and/or an axle stub, on the other hand. A sealing ring which is fixed to the wheel hub, the wheel bearing, and/or the axle stub and forms a sealing gap together with a mating contour on the wheel carrier or on a component fastened to the wheel carrier. The sealing ring has radial webs between which cells are formed. The cells are each radially delimited on the outside by a retaining wall, which in turn delimits the sealing gap radially on the inside in order, when the sealing ring rotates, to generate a flow opposed to a breaching of the seal in front of and/or in the sealing gap. There is also disclosed a wheel bearing arrangement with such a contact-free wheel bearing pre-seal.

15 Claims, 10 Drawing Sheets

(56)                    References Cited

U.S. PATENT DOCUMENTS

| | | | | |
|---|---|---|---|---|
| 5,195,830 | A | * | 3/1993 | Caillault ............... F16C 41/007 |
| | | | | 384/448 |
| 5,887,875 | A | * | 3/1999 | Salciccioli ........... F16C 33/805 |
| | | | | 277/402 |
| 8,353,390 | B2 | | 1/2013 | Wang et al. |
| 8,500,338 | B2 | | 8/2013 | Walter et al. |
| 10,550,941 | B2 | | 2/2020 | Maskaliunas |
| 11,286,991 | B2 | | 3/2022 | Kim et al. |
| 2015/0003765 | A1 | * | 1/2015 | Inoue ...................... F16C 33/74 |
| | | | | 384/477 |
| 2016/0245340 | A1 | | 8/2016 | Kaiser et al. |
| 2021/0370716 | A1 | * | 12/2021 | Kim ......................... F16D 3/223 |

FOREIGN PATENT DOCUMENTS

| | | | | |
|---|---|---|---|---|
| DE | 102008017409 A1 | | 10/2009 | |
| DE | 102011012942 A1 | | 12/2011 | |
| DE | 202010017137 U1 | | 2/2012 | |
| DE | 102016218450 A1 | | 3/2018 | |
| DE | 102016220382 A1 | | 4/2018 | |
| DE | 102018209390 A1 | | 1/2019 | |
| EP | 0285304 A2 | | 10/1988 | |
| JP | 2012224208 A | * | 11/2012 | ............ F16C 33/805 |
| WO | 2010018041 A1 | | 2/2010 | |
| WO | WO-2012077685 A1 | * | 6/2012 | ............ F16C 41/007 |
| WO | 2014053125 A1 | | 4/2014 | |
| WO | 2015048947 A1 | | 4/2015 | |
| WO | 2018138404 A1 | | 8/2018 | |

* cited by examiner

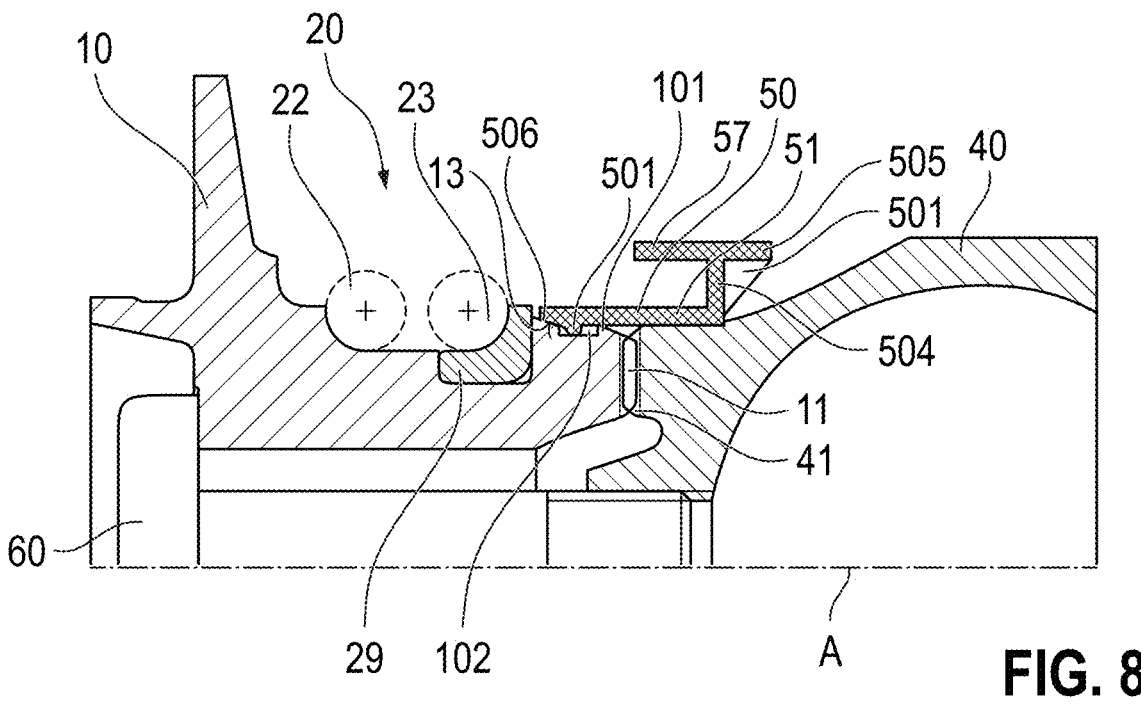
FIG. 8
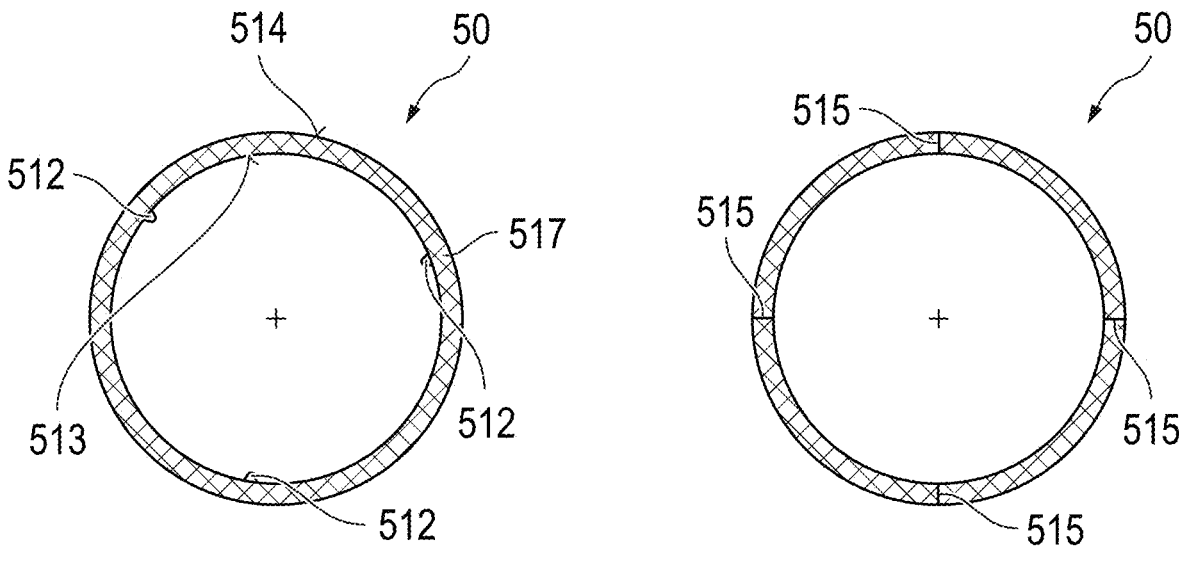
FIG. 9            FIG. 10

CONTACT-FREE WHEEL BEARING PRE-SEAL AND WHEEL BEARING ARRANGEMENT WITH SUCH A PRE-SEAL

CROSS-REFERENCE TO RELATED APPLICATION

This application claims the priority, under 35 U.S.C. § 119, of German Patent Application DE 10 2023 204 602.4, filed May 17, 2023; the prior application is herewith incorporated by reference in its entirety.

FIELD AND BACKGROUND OF THE INVENTION

The invention relates to a contact-free wheel bearing pre-seal between a wheel carrier, on the one hand, and a wheel hub, a wheel bearing and/or an axle stub, on the other hand. The wheel bearing pre-seal comprises a sealing ring which is fixed to the wheel hub, the wheel bearing and/or the axle stub and, and which forms a sealing gap with a mating contour located on the wheel carrier or on a component fastened to the wheel carrier.

Furthermore, the invention relates to a wheel bearing arrangement with such a contact-free wheel bearing pre-seal.

Conventional wheel bearings are usually already fitted with a seal on both sides. The purpose of this seal is to prevent the escape of lubricant and to prevent the ingress of water and dirt into the wheel bearing. Such seals are often designed as a contact seal, in which surfaces moving relative to each other, for example sealing lips or the like, lie directly adjacent to each other. Such surfaces lead to a certain amount of friction. In addition, these surfaces are inevitably subject to wear.

In order to reduce the penetration of water and dirt to the wheel bearing and thus to reduce the stress on the actual seal, it is already known to provide a so-called pre-seal or pre-sealing in addition to the actual seal. By means of such a wheel bearing pre-seal, the actual seal on the wheel bearing may be realized in a less complicated manner and in particular also with less friction.

The wheel bearing pre-seal is mounted upstream of the wheel bearing and its actual seal and accordingly preferably arranged between a wheel carrier as a non-rotating component on the one hand, and a wheel hub, optionally also a race of the wheel bearing or an axle stub as a rotating component, on the other hand.

An example of such a contact-free wheel bearing pre-seal between a wheel carrier, on the one hand, and a wheel hub, a wheel bearing, and/or an axle stub, on the other hand, is disclosed in international publication WO 2010/018041 A1 and its counterpart U.S. Pat. No. 8,500,338. The wheel bearing pre-seal is designed there as a labyrinth seal separate from the actual wheel bearing seal.

Another contact-free wheel bearing pre-seal in the manner of a labyrinth, which is suitable in particular for retrofitting to protect the wheel-side wheel bearing seal, is known from international publication WO 2014/053125 A1.

Another contact-free wheel bearing pre-seal, which acts in the manner of a centrifugal disk, is known from international publication WO 2015/048947 A1.

Another example of a contact-free wheel bearing pre-seal between a wheel carrier and at least one of a wheel hub, a wheel bearing, or an axle stub is described in German published patent application DE 10 2011 012 942 A1 and its counterpart U.S. Pat. No. 8,353,390 B2. The pre-seal there consists of a shielding plate, which is fastened to the wheel carrier and forms an annular gap toward an axle stub.

SUMMARY OF THE INVENTION

Against this background, it is an object of the invention to further improve the effectiveness of a contact-free wheel bearing pre-seal in order to enable the actual wheel bearing seal to be realized more simply and with less friction.

With the above and other objects in view there is provided, in accordance with the invention, a contact-free wheel bearing pre-seal between a wheel carrier, on the one hand, and a wheel hub, a wheel bearing, and/or an axle stub, on the other hand. The contact-free wheel bearing pre-seal comprising:

a sealing ring fixed to the wheel hub, the wheel bearing, and/or the axle stub and forming a sealing gap with a mating contour located on the wheel carrier or on a component fastened to the wheel carrier;

the sealing ring having radial webs and cells formed between the radial webs; and a retaining wall delimiting the cells radially outwardly and delimiting the sealing gap radially inwardly, and, when the sealing ring rotates, configured to generate a flow in front of and/or in said sealing gap that opposes a breaching of the seal.

The wheel bearing pre-seal according to the invention is distinguished in particular in that its sealing ring has radial webs between which cells are formed, wherein the cells are each delimited radially on the outside by a retaining wall, which in turn delimits the sealing gap radially on the inside in order, when the sealing ring rotates, to generate a flow opposed to the overcoming, or breaching, of the seal in front of and/or in the sealing gap.

The radial webs and cells act in the manner of a centrifugal pump when the sealing ring rotates. Radially outwardly displaced medium, such as water or air, is deflected in the axial direction via the retaining walls and thus generates a flow in front of and/or in the sealing gap.

Such a flow makes the ingress of water and dirt more difficult. In addition, water and dirt that have already penetrated can be conveyed out of the region to be sealed. As a result, the effectiveness of the wheel bearing pre-seal is considerably improved in a surprisingly simple way, and therefore the actual wheel bearing seal can be designed particularly simply and/or with particularly little friction.

Thus, radial webs and cells can be arranged on the outside of the seal of the sealing ring in order to generate a flow outward away from the sealing ring, the flow preventing the ingress of water and dirt. In addition, a suction effect can thereby be generated in the sealing gap, which promotes the removal of water and dirt which have already penetrated.

Furthermore, radial webs and cells are arranged on the inside of the seal of the sealing ring. The flow generated by the centrifugal pump effect can be directed onto the sealing gap in order to generate a flow from the inside to the outside within the sealing gap.

It should be expressly pointed out at this juncture that the arrangement on the outside of the seal and on the inside of the seal can also be combined with each other.

According to another particular embodiment of the invention, the radial webs can be arranged on an axial wall section of the sealing ring. This channels the flow course in the cells radially outward. In addition, the radial webs stiffen the sealing ring, and therefore the axial wall section can be realized with a comparatively small wall thickness.

In another special embodiment, the axial wall section of the sealing ring can extend in a plane perpendicular to the axis of rotation of the sealing ring.

In particular, the axial wall section of the sealing ring can be an annular surface perpendicular to the axis of rotation of the sealing ring.

According to another particular embodiment of the invention, the retaining walls of the cells can be formed by a peripheral outer circumferential wall section of the sealing ring, as a result of which the shaping and production of the sealing ring remain simple.

However, it is also possible in principle to realize the retaining walls as arc-shaped extensions of the radial webs. The latter do not necessarily have to be strictly aligned radially, but can also be positioned at an angle of about +/−20° with respect to the radial direction. In addition, the radial webs can also be provided with a curvature in the radial direction, with tangents to the radial webs in turn being able to enclose an angle of a maximum of about +/−20° with the radial direction.

According to a further particular embodiment of the invention, the height of the radial webs, namely their extent in the axial direction of the sealing ring from the axial wall section, increases radially outward, thus promoting the centrifugal pump action.

Furthermore, the radial webs at their radially outer ends end axially with the peripheral outer circumferential wall section. This provides optimal reinforcement of the outer circumferential wall section. As a result, the width of the sealing gap in turn can be reliably ensured.

According to another particular embodiment of the invention, the sealing ring can have a first fastening section for fixing to the axle stub and a second fastening section for fixing to the wheel hub and/or to the wheel bearing. In this case, the contact-free wheel bearing pre-seal in particular protects the wheel bearing seal on the other side of the wheel. In addition, by means of the sealing ring of the wheel bearing pre-seal, the interface between the wheel hub and the axle stub is also protected against the ingress of water and dirt.

In another special embodiment, the second fastening section is designed as a sleeve section of the sealing ring, the sleeve section on the inside of the seal axially adjoining the axial wall section of the sealing ring. The sleeve section can bridge said interface and can be correspondingly readily adapted in its axial length.

Furthermore, the sleeve section, at its free end facing away from the axial wall section, has a latching mechanism for latching to corresponding structures on the wheel hub and/or on the wheel bearing. This makes it possible first of all, during the installation, to pre-assemble the sealing ring of the wheel bearing pre-seal on the axle stub and to latch it thereto in the further course, namely when coupling the axle stub to the wheel hub.

In this case, the sealing ring can additionally take over the function of an installation securing means, which secures the wheel hub on the axle stub in a defined position against falling apart, before the two components are finally axially braced together.

According to another particular embodiment of the invention, the sleeve section can be supported axially against the axial wall section radially on the inside via support webs, which extend radially inward from the sleeve section. This improves the rigidity of the sealing ring, and therefore it can be realized with a low component weight, which is advantageous in particular with regard to the rotation of the sealing ring during operation.

Furthermore, the sealing ring can have a peripheral inner circumferential wall section, which has the first fastening section radially on the inside and on which the support webs are supported on the outside. This further improves the rigidity of the sealing ring of the wheel bearing pre-seal with the component weight being low at the same time.

The above-explained contact-free wheel bearing pre-seal is preferably used on a wheel bearing arrangement, in particular a wheel bearing arrangement of a passenger car or light commercial vehicle, which comprises a wheel hub, a wheel carrier, a wheel bearing, via which the wheel hub is mounted rotatably on the wheel carrier, and an axle stub which is coupled in terms of drive to the wheel hub. The contact-free wheel bearing pre-seal is arranged between the wheel carrier, on the one hand, and the wheel hub, the wheel bearing and/or the axle stub, on the other hand, wherein the sealing ring of the contact-free wheel bearing pre-seal is rotationally fixed to the wheel hub, the wheel bearing and/or the axle stub. By means of the arrangement of the sealing ring on the rotating component, via the radial webs and cells of the sealing ring during rotation a centrifugal pump effect can be generated, which in turn causes a flow in front of or in the sealing gap of the wheel bearing pre-seal, said flow being directed counter to the ingress of water and dirt.

Other features and embodiments which are considered as characteristic for the invention are set forth in the appended claims.

Although the invention is illustrated and described herein as embodied in a contact-free wheel bearing pre-seal and wheel bearing arrangement with such a pre-seal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 8 shows a longitudinal sectional view of a wheel bearing arrangement according to a seventh exemplary embodiment of the invention;

FIG. 9 shows a sectional view of a first embodiment variant of a sealing ring;

FIG. 10 shows a sectional view of a second embodiment variant of the sealing ring;

DETAILED DESCRIPTION OF THE INVENTION

Figure 1:
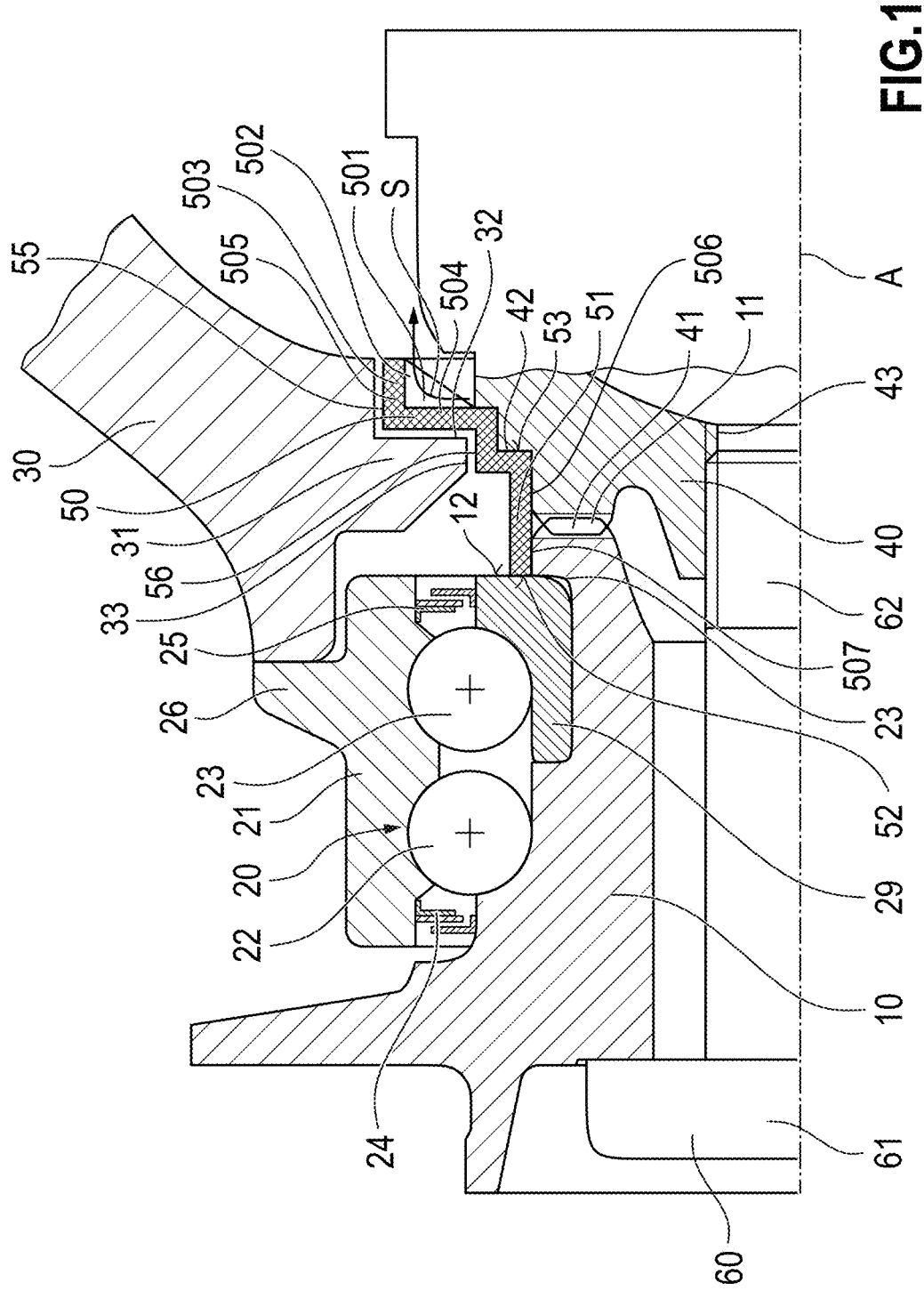
FIG. 1 shows a longitudinal sectional view of a wheel bearing arrangement having a contact-free wheel bearing pre-seal according to a first exemplary embodiment of the invention.

Each of exemplary embodiments of various wheel bearing arrangements with a contact-free wheel bearing pre-seal that are described in more detail below comprises a wheel hub 10, a wheel bearing 20, which is arranged on the wheel hub 10, a wheel carrier 30, to which the wheel bearing 20 is fixed by a wheel bearing outer ring 21, and an axle stub 40, here by way of example a constant velocity joint (CV joint) of a drive shaft, which is coupled to the wheel hub 10 so as to transmit torque. The coupling can be undertaken, for example, via an axial spline or the like. However, the coupling may in particular also be undertaken via an axially braced crown gearing arrangement 11/41, which will also be described in more detail further below.

Furthermore, each of the wheel bearing arrangements comprises a contact-free wheel bearing pre-seal with a sealing ring 50, which is fixed to the wheel hub 10, the wheel bearing 20 and/or the axle stub 40 and, with a mating contour located on the wheel carrier 30 or on a component fastened to the wheel carrier 30, forms a sealing gap.

In the figures illustrated and explained in more detail below, the sealing ring 50 of the contact-free wheel bearing pre-seal of an actual wheel bearing seal of the wheel bearing 20 is mounted upstream on the side facing away from the wheel. It is also possible in principle, however, to mount the wheel bearing pre-seal upstream of the wheel-side wheel bearing seal.

In addition, the contact-free wheel bearing pre-seal will be described below in connection with a wheel bearing arrangement, in which the wheel hub 10 is coupled by way of a crown gearing arrangement 11/41 to the axle stub 40 of a drive shaft. As explained above, instead of such a coupling with a crown gearing arrangement 11/41, other coupling structures can be provided between the wheel hub 10 and the axle stub 40.

The sealing ring 50 of the wheel bearing pre-seal can surround and seal the crown gearing arrangement or an alternative coupling structure radially on the outside. The sealing ring 50 can be pre-assembled on the axle stub 40 or constant velocity joint and can engage with the wheel hub 10 outside the force flux of the wheel bearing 20 in the assembled state of the wheel bearing arrangement.

As already mentioned, the sealing ring 50 in conjunction with the wheel carrier 30 forms a contact-free pre-seal for the wheel bearing 20 in order to inhibit the penetration of water and dirt to the wheel bearing 20.

For example, the sealing ring 50 can have an end face which, in the assembled state, is forced against an opposing end wall 12 of the wheel hub 10.

Additional dedicated wheel bearing seals 24 and 25 which seal the rolling bearings 22 and 23 to the outside can be provided on the wheel bearing 20, in particular on the rolling bearings 22 and 23 thereof, which rotatably support the wheel bearing outer ring 21 relative to the wheel hub 10. The wheel bearing seal 24 is arranged on the wheel side and the wheel bearing seal 25 on the other side of the wheel bearing. The contact-free wheel bearing pre-seal, which is provided by the sealing ring 50, is spaced apart from the rolling bearings 22 and 23 and is located between the axle stub 40 or constant velocity joint and the wheel carrier 30. Owing to the pre-sealing by the sealing ring 50, the dedicated wheel bearing seals 24 and 25 of the wheel bearing 20 can be realized with particularly little friction.

The rolling bearings 22 and 23 can be designed as complete bearings each with their own bearing inner ring and own bearing outer ring and with rolling elements arranged between them. However, it is also possible to integrate individual bearing rings in a common wheel bearing outer ring 21 and/or in the wheel hub 10.

In FIGS. 1 to 6, by way of example, the bearing outer rings of the rolling bearings 22 and 23 are combined to form a common wheel bearing outer ring 21, which can also form supporting and fastening structures 26 for attachment to the wheel carrier 30.

For the rolling bearing 22 which is on the left in FIGS. 1 to 6 and is thus remote from the constant velocity joint, the bearing inner ring is integrated in the wheel hub 10, whereas, by way of example, for the rolling bearing 23 which is on the right in FIG. 1 and is thus in the vicinity of the constant velocity joint, the bearing inner ring 29 is designed as an independent component. This bearing inner ring 29 may also be understood below as meaning a component or partial section of the wheel hub 10. In this respect, the sealing ring 50 of the contact-free wheel bearing pre-seal can also be supported, depending on the configuration of the bearing inner rings, on an end wall 12 of such a bearing inner ring 29 which in this case acts as part of the wheel hub 10.

If provided as separate bearing rings, they are axially fixed and supported with suitable axial securing means such as, for example, contact shoulders, axial securing rings, receiving grooves or the like on the respective wheel bearing outer ring 21 or on the wheel hub 10. The bearing inner ring 29 can be fixed, for example, by deforming an end section of the wheel hub 10 on the wheel hub 10. This can be undertaken, for example, by tumble forging or tumble pressing. The sealing ring 50 of the contact-free wheel bearing pre-seal therefore does not have to absorb any axial bearing forces. Since said sealing ring does not have a supporting function, there is a great deal of freedom for designing the sealing ring 50 of the contact-free wheel bearing pre-seal. This also permits more complex shapes. In particular, the sealing ring 50 of the contact-free wheel bearing pre-seal can be produced cost-effectively from plastic, for example.

In addition, this permits the integration of a wheel rotational speed sensor, the sensor of which is arranged as a ring in the wheel bearing seal 25. The associated transducer can be arranged, for example, axially between the wheel bearing seal 25 and the sealing ring 50 of the contact-free wheel bearing pre-seal, while the associated sensor housing with further components of the wheel rotational speed sensor can sit in a recess or bore on the wheel carrier 30.

In addition to providing a contact-free pre-seal for the wheel bearing 20, the sealing ring 50 can also serve to radially surround and seal the crown gearing arrangement 11/41, already mentioned, on the outside and thus to protect it against corrosion. For this purpose, the sealing ring 50 of the contact-free wheel bearing pre-seal can be clamped, for example, axially between the wheel hub 10 and the constant velocity joint 40. However, it is also possible to fix the sealing ring 50 of the contact-free wheel bearing pre-seal on said components in another way, for example by latching, pressing, adhesive bonding or the like.

In the exemplary embodiments illustrated by way of example, the crown gearing arrangement 11/41 forms the interface between the constant velocity joint 40 and the wheel hub 10. A respective crown gearing 11 and 41 is in each case formed for this purpose at mutually opposite end walls of the constant velocity joint 40 and the wheel hub 10. The teeth of these two crown gearings 11 and 41 engage with each other. Crown gearings are understood here as meaning an end-face radial toothing structure on a component, which is couplable to a corresponding end-face radial toothing structure on another component for the purpose of transmitting torque. The engagement of the teeth is free from play and suitable for transmitting high torques. Such crown gearing arrangements are occasionally also referred to as serration or spur toothing arrangements.

A clamping device 60, preferably in the form of a clamping bolt, is used, in the clamped state of same, to keep the two crown gearings 11 and 41 on the wheel hub 10 and on the constant velocity joint 40 axially in engagement with each other.

The clamping device 60 preferably extends centrally through the two crown gearings 11 and 41. In particular, the clamping device 60, or the clamping bolt, can be supported with a head 61 on the wheel hub 10 and screwed to the constant velocity joint 40 via a thread 62. Installation the other way around is also possible.

As already mentioned above, the sealing ring 50 of the wheel bearing pre-seal, with a mating contour located on the wheel carrier 30 or on a component fastened to the wheel carrier 30, forms a sealing gap. To improve the sealing effect, radial webs 501 are provided on the sealing ring 50, between which cells 502 are in each case formed in the circumferential direction. The number of radial webs 501 is of the order of 1 to 60.

Figure 14:
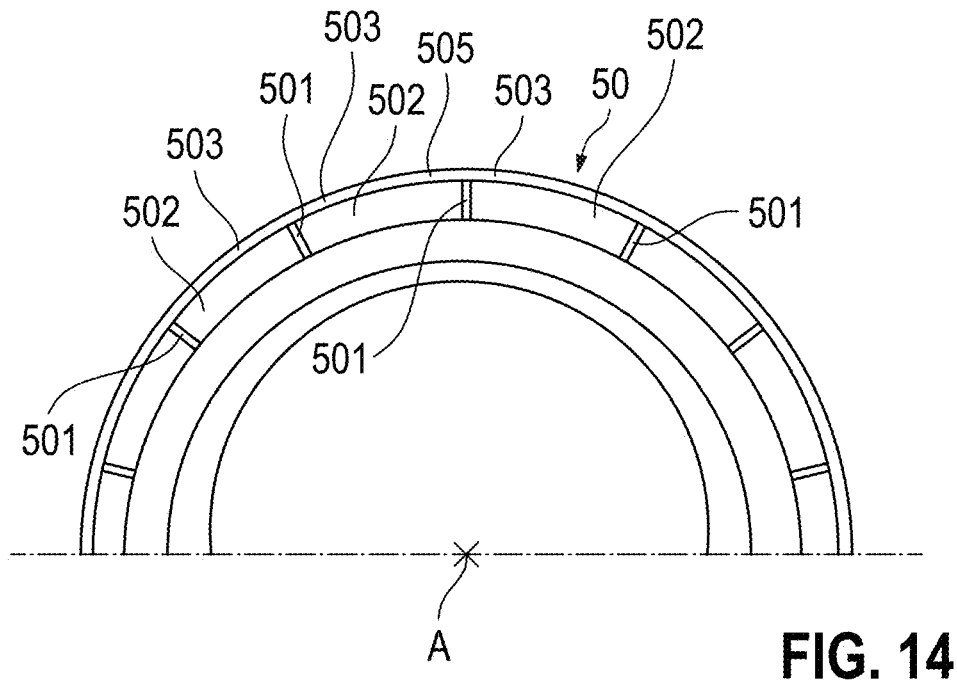
FIG. 14 shows a view in the axial direction of the sealing ring of the wheel bearing pre-seal from FIG. 13, as seen from the outside of the seal.

The radial webs 501 do not necessarily have to be strictly aligned radially, as can be seen, for example, in FIG. 14, but can also be adjusted at an angle of about +/−20° with respect to the radial direction. In addition, the radial webs 501 can also be provided with a curvature in the radial direction, with tangents to the radial webs 501 in turn being able to enclose an angle of a maximum of about +/−20° with the radial direction.

The cells 502 are each delimited radially on the outside by a retaining wall 503, which in turn delimits the sealing gap radially on the inside. By contrast, in the radial direction inward, the cells 502 are preferably open. When the sealing ring 50 is rotated, a flow opposed to the breaching of the seal is generated in front of or in the sealing gap. This prevents water and dirt from penetrating the sealing gap. Water and dirt that have already penetrated are drained away to the outside because of the flow. This significantly increases the sealing effect of the contact-free pre-seal.

Referring now with more specificity to FIG. 1, this increased sealing effect is indicated by way of example by an arrow S, which indicates the flow direction of medium, whether air and/or water, located upstream of the sealing ring 50. As a result of the rotation of the sealing ring 50, the medium is carried along by means of the radial webs 501 and flows radially outward as a result of the centrifugal/centripetal force until it is deflected in the axial direction by the respective retaining wall 503 of the corresponding cell 502.

If the radial webs 501 and cells 502 are arranged on the outside of the seal on the sealing ring 50, the medium is guided away from the sealing ring 50 in the region of the mouth of the sealing gap. This flow makes it much more difficult for water and dirt to penetrate the sealing gap 50. In addition, the substantially axial flow at the mouth on the outside of the sealing gap creates a suction effect for the sealing gap, which further impedes the entry of water and dirt and drains away any water and dirt that has entered to the outside.

Corresponding radial webs 501 and cells 502 can also be arranged on the inside of the seal on the sealing ring 50. The flow generated by the centrifugal pump effect can be directed onto the sealing gap in order to generate a flow from the inside to the outside within the sealing gap.

The radial webs 501 can be arranged on an axial wall section 504 of the sealing ring 50.

The axial wall section 504 of the sealing ring 50 can extend in a plane perpendicular to the axis of rotation A of the sealing ring 50.

In particular, the axial wall section 504 of the sealing ring 50 can be an annular surface perpendicular to the axis of rotation A of the sealing ring 50.

The retaining walls 503 of the cells 502 can be formed by a peripheral outer circumferential wall section 505 of the sealing ring 50.

Preferably, the radial webs 501 are connected at their radially outer ends to the outer circumferential wall section 505, as a result of which the latter is reinforced.

The height of the radial webs 501, which is understood in the present case as meaning the axial extent of the radial webs 501 away from the axial wall section 504, preferably increases radially outward.

In addition, the radial webs 501 at their radially outer ends end axially with the peripheral outer circumferential wall section 505.

This sealing principle at the wheel bearing pre-seal can be incorporated in different ways in the exemplary embodiments explained in the FIGS. 1 to 14 below.

In some embodiment variants, the sealing ring 50 can have a first fastening section 506 for fixing to the axle stub 40 and a second fastening section 507 for fixing to the wheel hub 10 and/or to the wheel bearing 20.

FIG. 1 shows a first exemplary embodiment, in which the above-explained sealing ring 50 of the contact-free wheel bearing pre-seal has a sleeve-shaped first sealing section 51, which surrounds the crown gearing arrangement 11/41 radially in the manner of a sleeve and rests, for example, on corresponding outer circumferential sections of the wheel hub 10 and of the axle stub 40 or constant velocity joint. A first end face 52 of the sealing ring 50 is supported against an end wall 12 of the wheel hub 10, here against the bearing inner ring 29 of the right-hand rolling bearing 23, and an opposite second end face 53 is supported against a wall shoulder 42 of the constant velocity joint 40. The sealing function with respect to the crown gearing arrangement 11/41 can be undertaken at the end faces 52, 53 and/or with respect to the outer circumferential sections of the wheel hub 10 and the constant velocity joint 40. If sealing takes place against the outer circumferential sections of the wheel hub 10 and the constant velocity joint 40, axial supporting of the end faces 52 and/or 53 may optionally be omitted. The first fastening section 506 for fixing to the axle stub 40 and the second fastening section 507 for fixing to the wheel hub 10 are located here on the first sealing section 51.

From the sleeve-shaped first sealing section 51, a peripheral axial wall section 504 protrudes radially and forms an annular surface perpendicular to the axis of rotation A. The axial wall section 504 is radially adjoined on the outside by a peripheral outer circumferential wall section 505. The axial wall section 504 and the peripheral outer circumferential wall section 505, with corresponding wall sections on the wheel carrier 30, form a narrow sealing gap which inhibits the ingress of water and dirt and thus acts as a pre-seal for the wheel bearing 20 or its wheel bearing seal 25.

The axial wall section 504 and the peripheral outer circumferential wall section 505 can thus be understood as meaning a second sealing section 57 on the sealing ring.

In particular, for this purpose, a radially inwardly directed projection 31, which has an axial annular wall 32 parallel to the axial wall section 504, can be formed on the wheel carrier 30. The peripheral outer circumferential wall section 505 has a corresponding peripheral wall section lying radially opposite it on the wheel carrier 30. In the longitudinal sectional profile of the sealing ring 50 according to FIG. 1, this results in an L-shaped sealing gap with a gap path running radially with respect to the axis of rotation A of the wheel hub 10 and an axial gap path parallel to the axis of rotation A. The extent of the radial gap path may be greater than the axial gap path on the outside of the seal between the peripheral outer circumferential wall section 505 and the wheel carrier 30.

An additional axial gap path on the inside of the seal can be provided between a radial inner edge 33 of the projection 31 and the sleeve-shaped first sealing section 51 or a step 56 optionally provided on the latter, as illustrated in FIG. 1.

Since the projection 31 is located on the wheel carrier 30, the projection 31 can be designed relatively freely. In particular, it is possible to form the projection 31 integrally with the wheel carrier 30. However, it is also possible to fasten a corresponding ring for the projection 31 to the wheel carrier 30 in order optionally to create even more complex sealing gap configurations or labyrinths.

In FIG. 1, the radial webs 501 and cells 502 are located on the outside of the seal on the axial wall section 504 and extend radially as far as the peripheral outer circumferential wall section 505, which in the present case forms the retaining walls 503. The radial webs 501 reinforce the axial wall section 504 and the peripheral outer circumferential wall section 505, such that they can be realized with small wall thicknesses. As a result, the weight of the sealing ring 50 remains low.

In a modification of FIG. 1, the sealing ring 50 can also be provided with only the function of the second sealing section 57, that is, the wheel bearing pre-seal, whereas the function of the first sealing section 51 is omitted.

Figure 2:
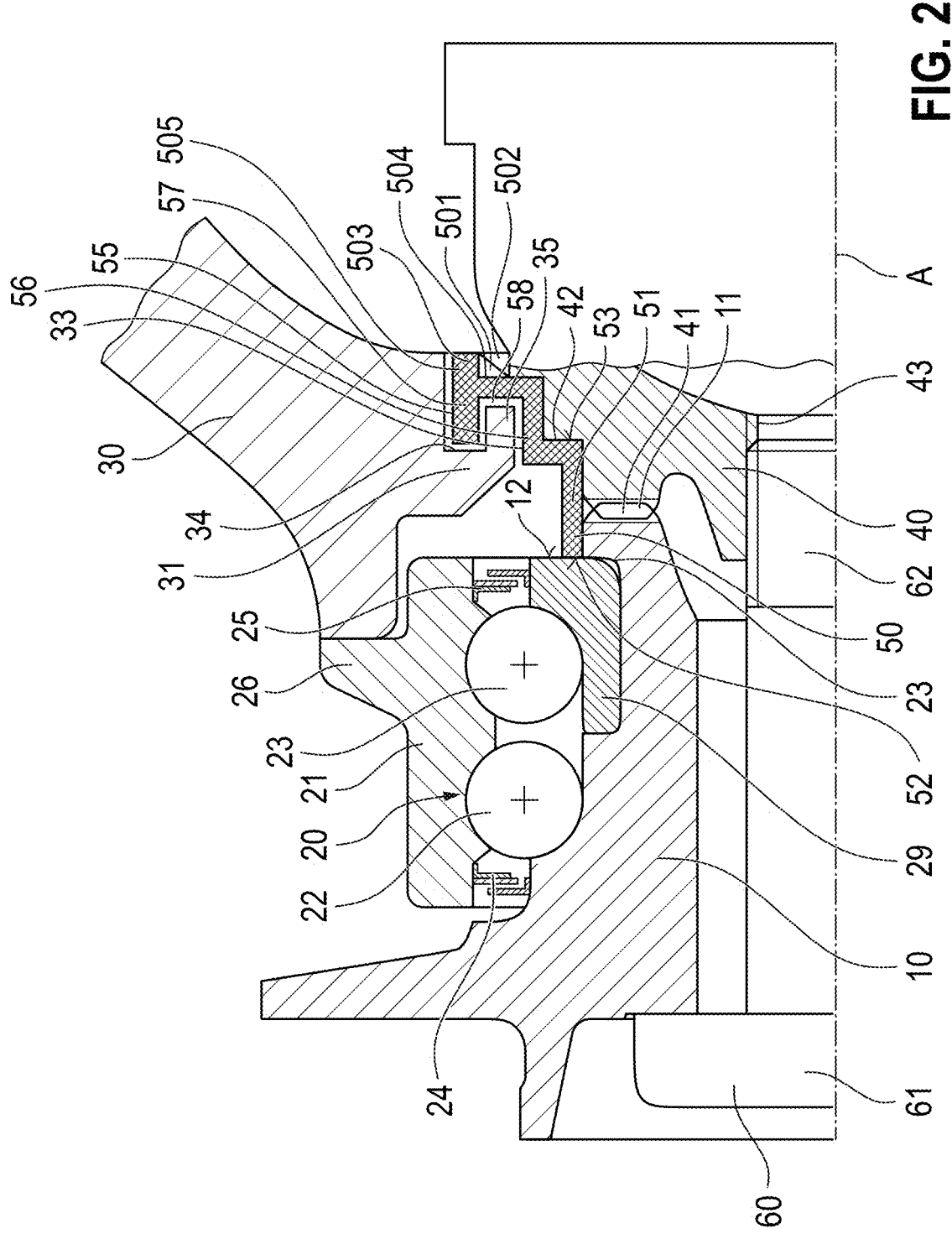
FIG. 2 shows a longitudinal sectional view of a wheel bearing arrangement according to a second exemplary embodiment of the invention.

An alternative labyrinth shape for the sealing gap of the wheel bearing pre-seal is illustrated by way of example in FIG. 2. In that case, the sealing ring 50, in addition to the sleeve-shaped first sealing section 51 for the radial sealing of the crown gearing arrangement 11/41, has a more complex second sealing section 57 for providing the pre-seal. In contrast to FIG. 1, the peripheral outer circumferential wall section 505 extends from the outer edge of the axial wall section 504 in FIG. 2 axially not only in one direction, but in both directions, resulting in a more complex sealing labyrinth with more direction changes instead of an L-shaped sealing gap.

The sleeve-shaped first sealing section 51 may be realized with or without a step 56, as in FIG. 1.

In particular, the sleeve-shaped first sealing section 51, the peripheral outer circumferential wall section 505 and the axial wall section 504 can form an approximately C-shaped longitudinal section profile on the inside of the seal in a longitudinal sectional plane, and therefore an annular groove 58 is formed around the axis of rotation A on the sealing ring 50, in which annular groove a corresponding longitudinal sectional profile on the wheel carrier 30 engages. In this case, as shown in particular in FIG. 2, between the sleeve-shaped first sealing section 51, the peripheral outer circumferential wall section 505 and the axial wall section 504, on the one hand, and the corresponding longitudinal sectional profile on the wheel carrier 30, on the other hand, a gap is formed as a complex sealing labyrinth, which provides a high level of protection against the ingress of water and dirt within the scope of a wheel bearing pre-seal.

The corresponding longitudinal sectional profile on the wheel carrier 30 may in turn have at least one annular groove 34, for example on said projection 31. The annular grooves 58 and 34 on the sealing ring 50 and on the wheel carrier 30 can be intermeshed to realize a longest possible gap path on the wheel bearing pre-seal within a compact space. In FIG. 2, the sleeve-shaped peripheral outer circumferential wall section 505 extends axially into the annular groove 34 on the wheel carrier 30. Similarly, the inner edge 35 of the annular groove 34 extends axially into the annular groove 58 on the sealing ring 50. This principle can be extended by connecting a plurality of annular grooves in series.

As already explained in connection with FIG. 1, the sealing effect of the wheel bearing pre-seal can be additionally improved by flow effects by, as described above, radial webs 501 on the axial wall section 504 being provided on the outside of the seal in order to form radially delimited cells 502 by means of retaining walls 503.

In the exemplary embodiments illustrated, the axial wall section 504 can preferably be connected to an axial end section of the sleeve-shaped first sealing section 51, preferably on the part of the axle stub 40 or constant velocity joint.

Preferably, the sleeve-shaped first sealing section 51 and the peripheral outer circumferential wall section 505 extend axially in the same direction from the axial wall section 504.

The sleeve-shaped peripheral outer circumferential wall section 505 and the axial wall section 504 and optionally also the sleeve-shaped first sealing section 51, together with the projection 31 located on the wheel carrier 30, form a sealing labyrinth, the course of which from the outside to the inside of the pre-seal in a longitudinal sectional plane contains at least two direction changes, in particular three or four direction changes, to increase the prevention of the ingress of water and dirt.

In a modification of the exemplary embodiments in FIGS. 1 and 2, the sealing ring 50 can also be installed rotated axially by 180°. In FIG. 2, the annular groove 58 then does not open toward the wheel hub 10, but toward the axle stub 40 or constant velocity joint. Radial ribs 501 and retaining walls 503 are also provided in this case in such a way in order, when the sealing ring 50 rotates, to generate a flow opposed to the overcoming of the pre-seal in front of or in the sealing gap.

Figure 3:
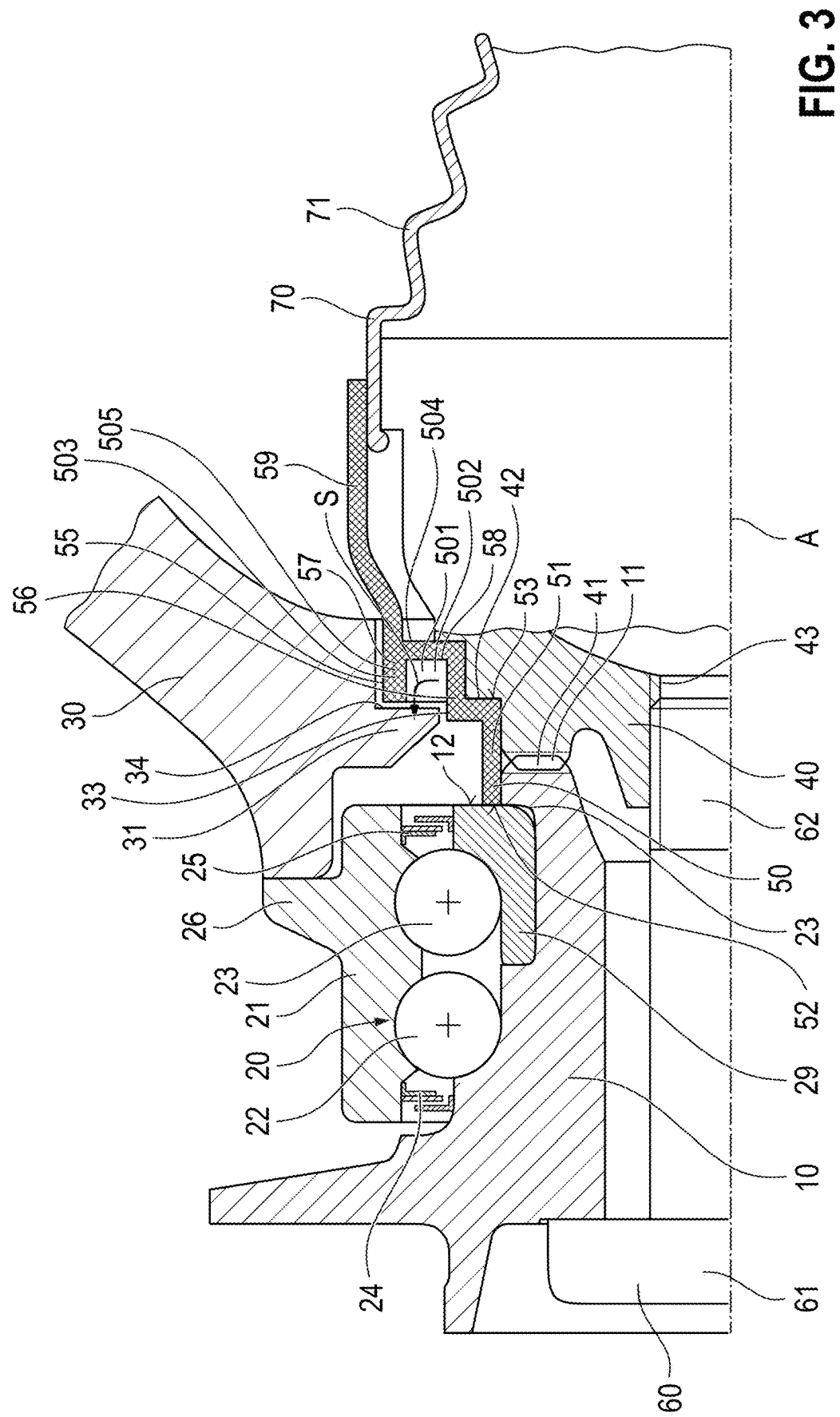
FIG. 3 shows a longitudinal sectional view of a wheel bearing arrangement according to a third exemplary embodiment of the invention.
Figure 4:
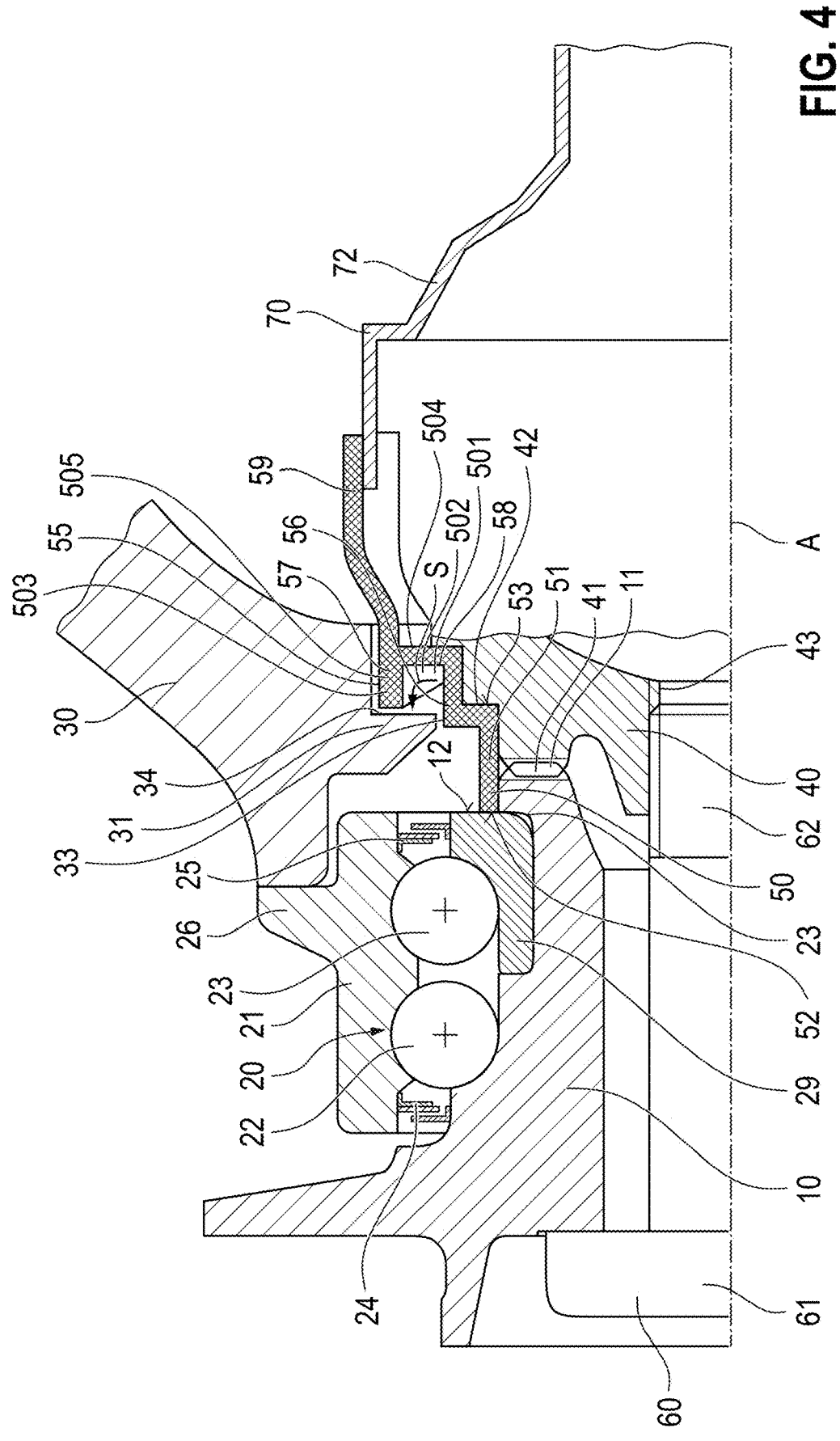
FIG. 4 shows a longitudinal sectional view of a wheel bearing arrangement according to a fourth exemplary embodiment of the invention.
Figure 5:
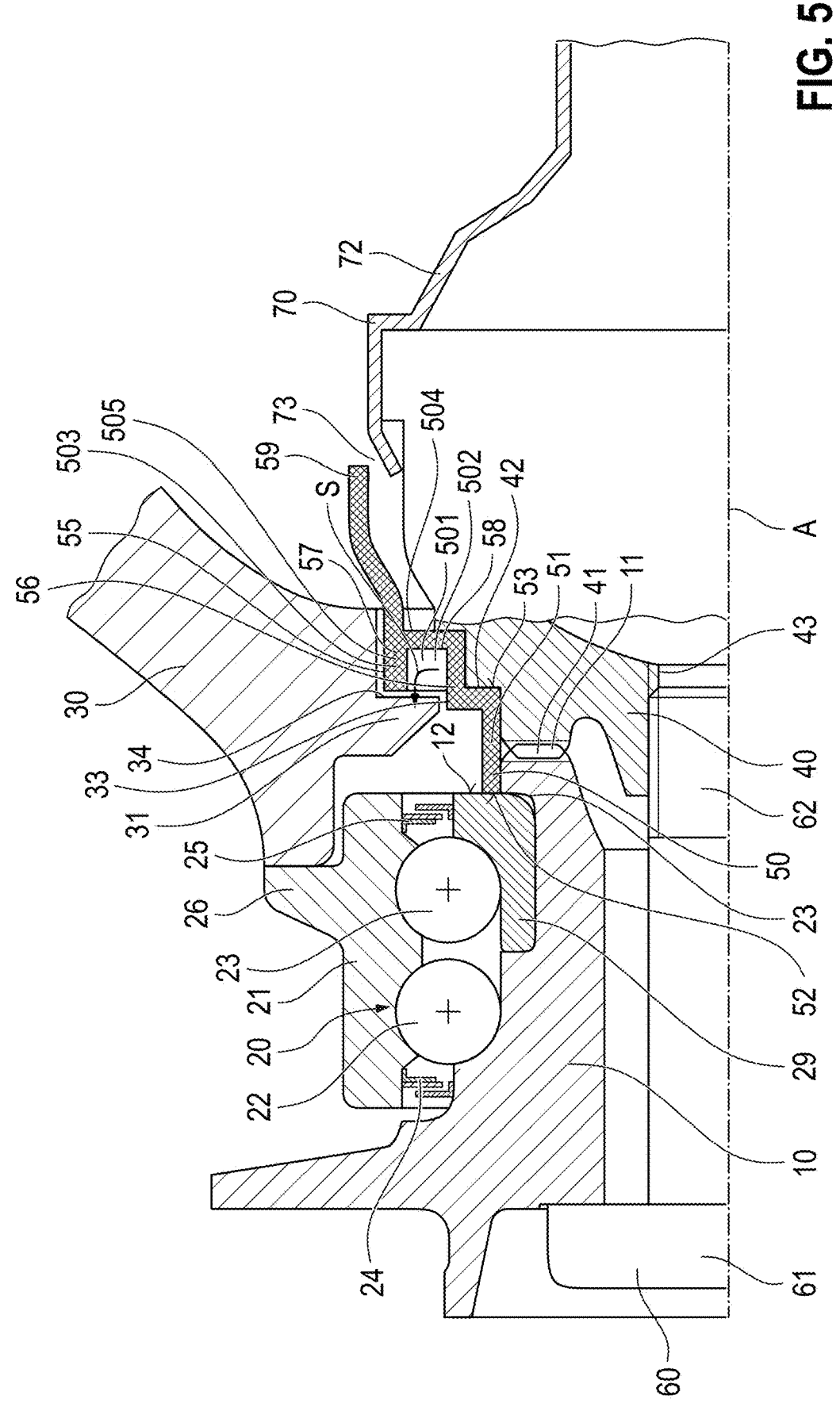
FIG. 5 shows a longitudinal sectional view of a wheel bearing arrangement according to a fifth exemplary embodiment of the invention.

Furthermore, the sealing ring 50 can have radial webs 501 and cells 502 not only on the outside of the seal, but alternatively or additionally also on the inside of the seal, as illustrated by way of example in FIGS. 3 to 5. For this purpose, the projection 35 on the wheel carrier 30 can be omitted in FIG. 2. One or more radial ribs 501 are now arranged in the groove 58 of the sealing ring 50, which ribs extend radially as far as the peripheral outer circumferential wall section 505 and which, in the present case, form the retaining walls 503 for the cells 502 formed between the radial ribs 501. As indicated in FIG. 3 by the arrow S, when the sealing ring 50 rotates, a radial flow is again generated, which is deflected axially in the region of the retaining walls 503. In the present case, this deflected flow is directed into the sealing gap in order to make the penetration of water and dirt more difficult and to drain away water and dirt which may have entered to the outside.

The radial ribs 501 can optionally adjoin the sleeve-shaped first sealing section 51 radially on the outside to reinforce the sealing ring in the region of the groove 58.

As shown in FIGS. 3 and 5, the radial ribs 501 can each have a constant height. However, a configuration with a radially outwardly rising height is also possible, as shown by way of example in FIG. 4.

Figure 12:
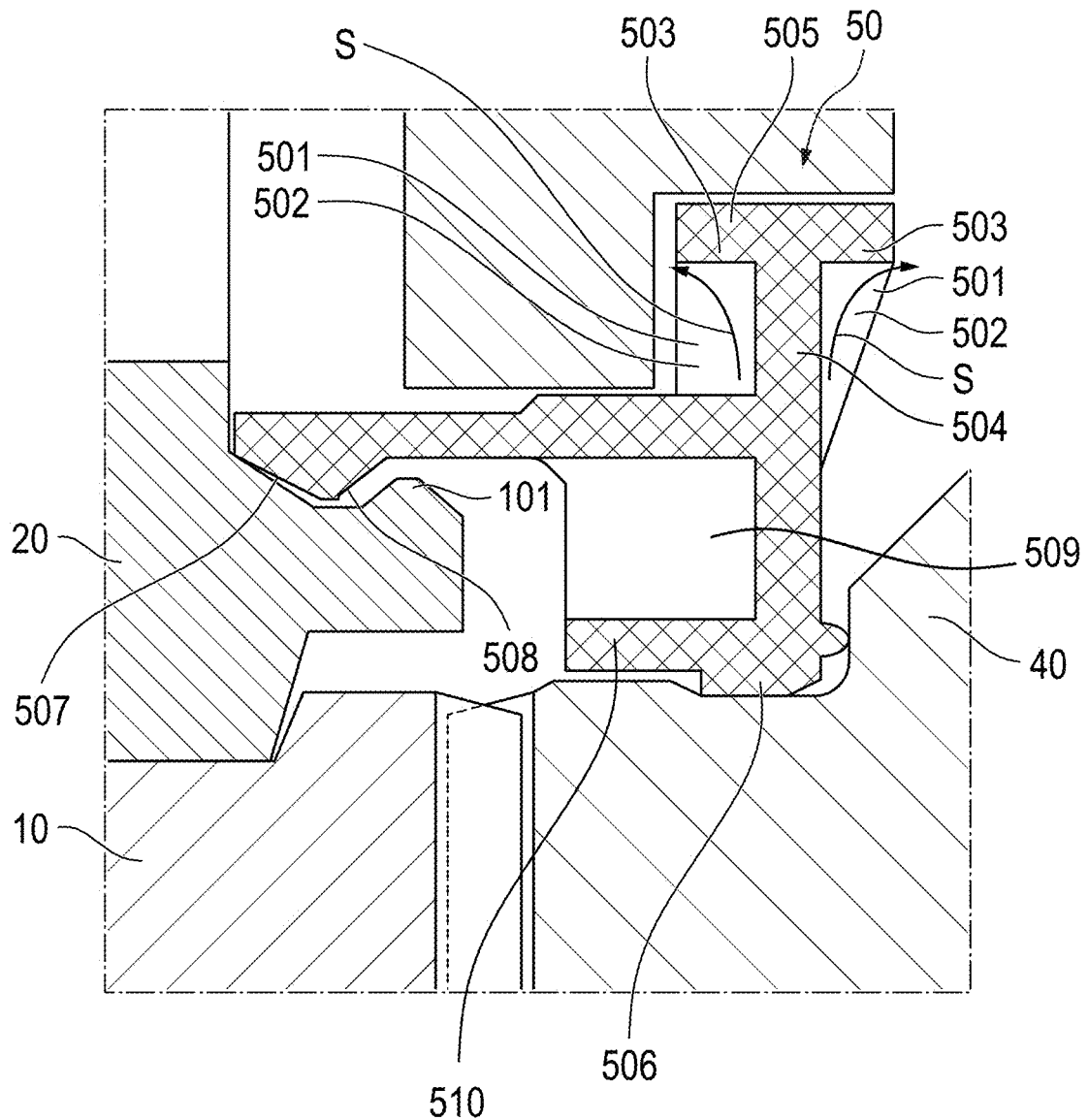
FIG. 12 shows a longitudinal sectional view of a further exemplary embodiment of a contact-free wheel bearing pre-seal according to the invention.
Figure 13:
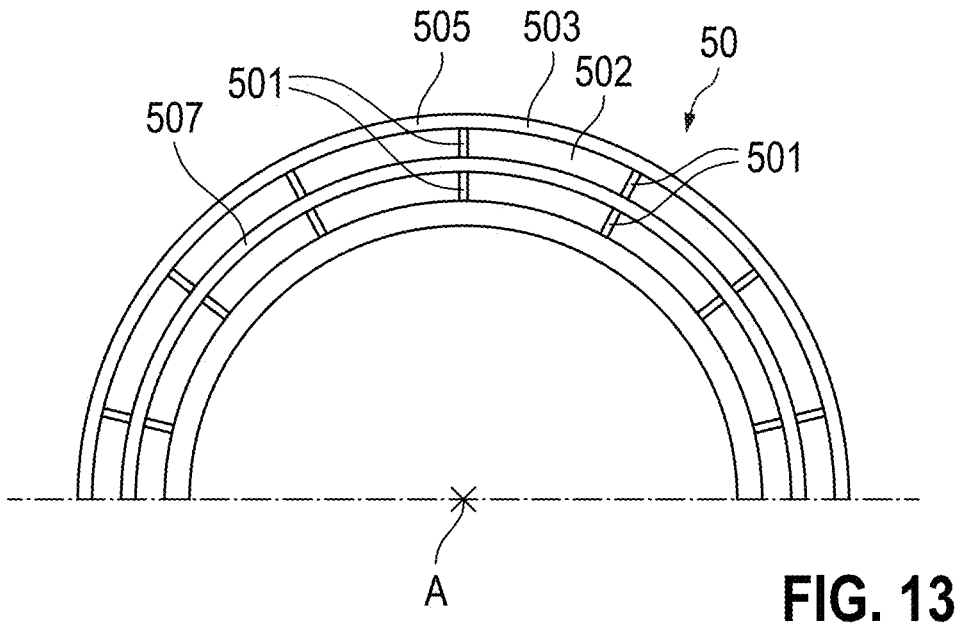
FIG. 13 shows a view in the axial direction of the sealing ring of the wheel bearing pre-seal from FIG. 13, as seen from the inside of the seal.

A further possible configuration of the sealing ring 50 is shown in FIGS. 12 to 14. This sealing ring 50 in turn has radial webs 501, wherein cells 502 are formed between respectively adjacent radial webs 501. Each of the cells 502 is delimited radially on the outside by a retaining wall 503, which in turn radially delimits a sealing gap running axially and in the circumferential direction on the inside, such that, when the sealing ring 50 rotates, a flow opposed to the overcoming of the seal is generated in front of and/or in the sealing gap.

In FIGS. 12 to 14, the radial webs 501 and cells 502 are arranged both on the inside of the seal and on an axial wall section 504 of the sealing ring 50. The axial wall section 504 runs in a plane perpendicular to the axis of rotation A of the sealing ring 50 and preferably forms an annular surface from which the radial webs 501 each protrude axially.

When the sealing ring 50 rotates, the flow indicated by arrows S forms along the axial wall section 504 because of the radial webs 501 and the retaining walls 503 and is deflected in the region of the retaining walls 503, in order in turn to induce a flow opposed to the overcoming of the pre-seal in front of and/or within the sealing gap.

The height of the radial webs 501, namely the extent thereof away from the axial wall section 504 in the axial direction of the sealing ring 50, can increase radially outward, as shown by way of example for the radial webs 501 on the outside of the seal. However, a constant height is also possible, as shown by way of example for the radial webs 501 on the inside of the seal.

In addition, the radial webs 501 at their radially outer ends can end axially with the peripheral outer circumferential wall section 505 in order to optimally reinforce the latter, as a result of which the cross section of the sealing gap can be readily maintained.

The sealing ring 50 in FIGS. 12 to 14 has at least one first fastening section 506 for fixing to the axle stub 40. Optionally, a second fastening section 507 may also be provided, via which fixing to the wheel hub 10 and/or to the wheel bearing 20, in particular to an inner ring thereof, can additionally be carried out. In a modification thereof, the first fastening section 506 may also be omitted, and therefore the fastening to a rotating component is carried out solely via the second fastening section 507.

The second fastening section 507 may be designed as a sleeve section, which axially adjoins the axial wall section 504 on the inside of the seal. At its free end facing away from the axial wall section 504, the sleeve section may have a latching mechanism or latch 508 for latching to corresponding structures 101 on the wheel hub 10 and/or the wheel bearing 20, as has been explained, for example, above with reference to FIGS. 6 and 7. However, in the case of a pure fastening function, the function of the additional play-affected installation securing means may be omitted.

Furthermore, the sleeve section can be supported axially against the axial wall section 504 radially on the inside via support webs 509. The support webs 509 extend radially inward from the sleeve section of the second fastening section 507. They are used to reinforce the sleeve section and thus to improve the fastening function.

In the exemplary embodiment in FIGS. 12 to 14, a peripheral inner circumferential wall section 510 is furthermore formed on the sealing ring 50. This inner circumferential wall section 510 is connected via the axial wall section 504 to the sleeve section of the second fastening section 507 and to the peripheral outer circumferential wall section 505. It can also be of sleeve-like design.

The inner circumferential wall section 510 has the first fastening section 506 radially on the inside. In addition, the support webs 509 can be supported radially on the outside of the inner circumferential wall section 510.

The exemplary embodiments explained above can be further modified with respect to the sealing ring 50 in that a sleeve-shaped third sealing section 59 is additionally provided on the sealing ring 50, which third sealing section 59 protrudes axially from the second sealing section 57 in the direction of the axle stub 40 or constant velocity joint and lies sealing against a sealing element 70 of the axle stub 40 or constant velocity joint, as this is shown by way of example in FIGS. 3 and 4.

The sealing element 70 of the constant velocity joint 40 may, for example, be an expansion bellows 71, a rolling bellows, a sheet metal cap 72 with an expansion bellows or the like. It serves to seal the constant velocity joint 40 on its opening side such that no grease can escape from, or dirt can enter, the constant velocity joint 40. Sheet metal caps 72 are generally pressed onto the outer circumference of the constant velocity joint 40 and crimped. Expansion bellows 71 and rolling bellows can be fastened to the outer circumference of the constant velocity joint 40, for example, by means of hose clips, clamps or the like.

By means of the contact between the sleeve-shaped third sealing section 59 of the sealing ring 50 of the wheel bearing pre-seal and the sealing element 70 of the constant velocity joint 40, the constant velocity joint 40 is outwardly completely covered such that painting of the outer surfaces of the constant velocity joint 40 to ensure a rust-free appearance can be omitted. The sealing ring 50 to a certain extent closes the gap between the sealing element 70 of the constant velocity joint 40 and the wheel hub 10 in the manner of a cover.

In a further exemplary embodiment according to FIG. 5, a small annular gap 73 between the sealing ring 50 and the sealing element 70 of the constant velocity joint 40 can also be intentionally provided, in a modification of FIGS. 3 and 4, so that incoming water can quickly escape again. The centrifugal force acting when the drive shaft is rotating can be used in this connection. As shown in FIG. 5, the sealing ring 50 accordingly has a sleeve-shaped third sealing section 59, which axially protrudes from the second sealing section 57 in the direction of the constant velocity joint 40 and forms an annular gap 73 with the sealing element 70 of the constant velocity joint 40, such that incoming water can be drained away under centrifugal force. The annular gap 73 preferably has a gap width of 1 to 3 mm.

The third sealing section 59 in FIGS. 3, 4 and 5 can furthermore be designed in such a way that it extends radially further outward than the widest extent radially outward of an annular groove 34 for engagement with the sleeve-shaped second sealing section 57, in order to further complicate the ingress of water and dirt via the pre-seal.

Furthermore, as explained below with reference to FIGS. 6 to 11, the sealing ring 50 can also be used as an installation aid in the assembly of the wheel bearing arrangement. When a crown gearing arrangement is installed, care must namely be taken to ensure that the corresponding crown gearings 11 and 41 intermesh correctly so that there is no tooth-on-tooth installation. Such an installation aid function can be additionally provided in the exemplary embodiments already explained above.

Figure 6:
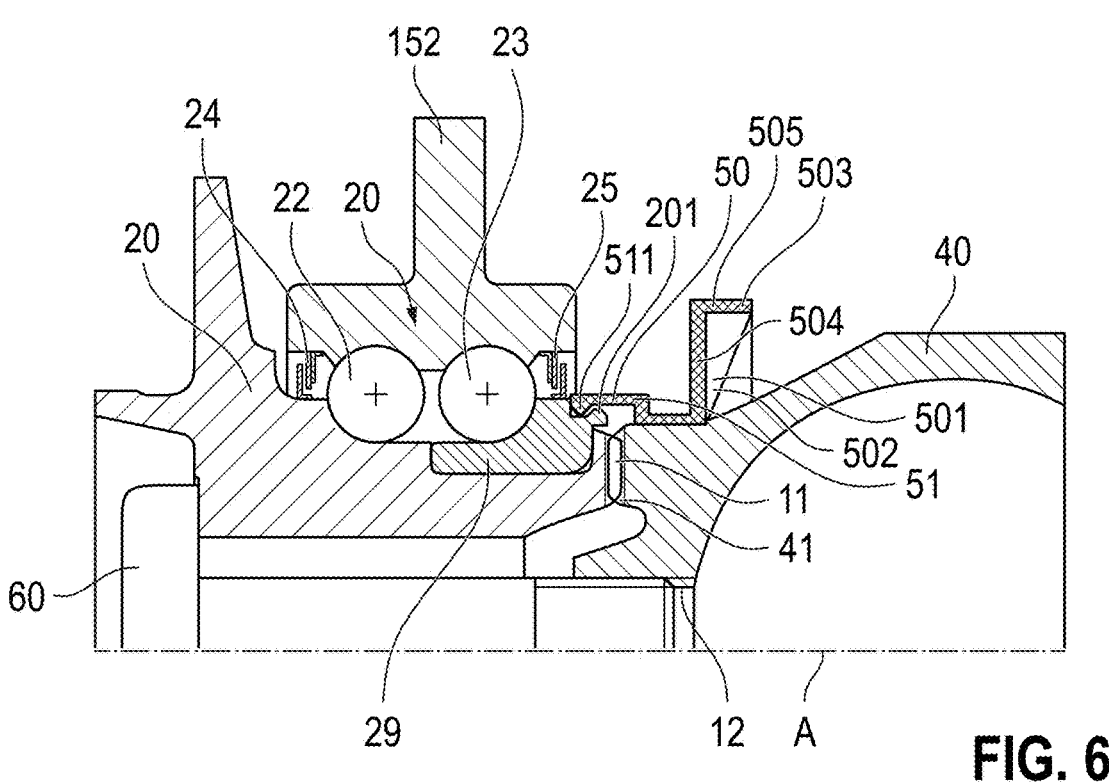
FIG. 6 shows a longitudinal sectional view of a wheel bearing arrangement according to a sixth exemplary embodiment of the invention.

The sixth exemplary embodiment in FIG. 6 shows an axially braced crown gearing arrangement in a braced final installation position.

Said arrangement comprises the first crown gearing 11 on the wheel hub 10. Crown gearings are understood here as meaning an end-face radial toothing structure on a component, which is couplable to a corresponding end-face radial toothing structure on another component for the purpose of transmitting torque. The axially braced crown gearing arrangement furthermore comprises the second crown gearing 41 on the constant velocity joint 40. The first crown gearing 11 and the second crown gearing 41 are in meshing engagement with each other. Said meshing engagement is free from play in FIG. 6 and suitable for transmitting high torques.

Furthermore, the axially braced crown gearing arrangement comprises the clamping device 60, preferably in the form of a clamping bolt, by which, in the clamped state of same, the first crown gearing 11 and the second crown gearing 41 are axially braced together. The clamping device 60 preferably extends centrally through the two crown gearings 11 and 41. In particular, the clamping device 60, or the clamping bolt, can be supported on the wheel hub 20 and screwed to the constant velocity joint 40. Installation the other way around is also possible.

The sealing ring 50 surrounds the first crown gearing 11 and the second crown gearing 41 radially on the outside and seals them. By means of the sealing ring 50, the first crown gearing 11 and the second crown gearing 41 are held loosely in engagement with each other in a manner explained in more detail below. This loose engagement state is also considered here to be a pre-assembly position, in which the wheel hub 10 and the constant velocity joint 40 are already roughly aligned with each other and secured by the sealing ring 50 against falling apart.

Figure 7:
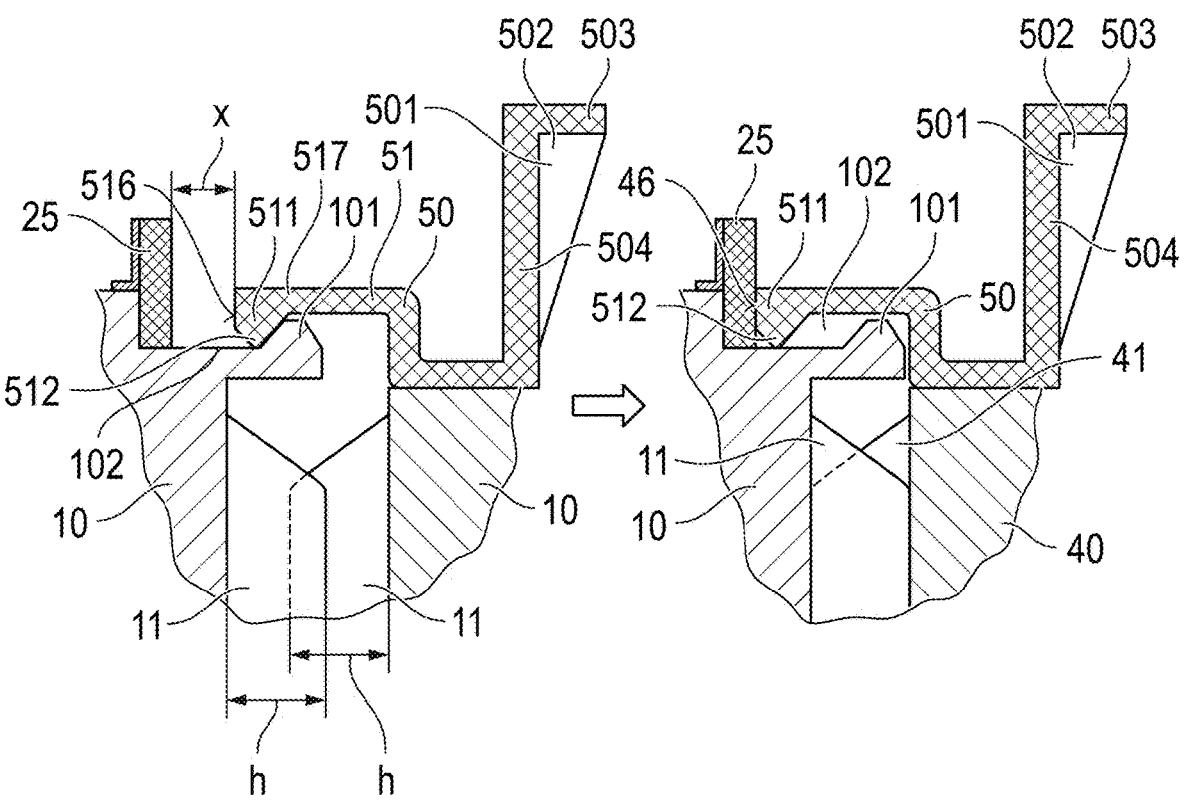
FIG. 7 shows a schematic illustration of an embodiment variant for illustrating a pre-assembly position (left) and a final installation position (right) of components to be joined together enclosing an axially braced crown gearing arrangement.

As indicated on the left in FIG. 7, in the pre-assembly position, an axial clearance x between the two crown gearings 11 and 41 is smaller than the height h of the teeth of the first crown gearing 11 and the second crown gearing 41. Once the pre-assembly position has been reached, it can therefore be assumed that a tooth-on-tooth position of the teeth of the first crown gearing 11 and second crown gearing 41 is prevented.

In a second step, the clamping device 60 can be clamped accordingly after the production of the pre-assembly position, in order to produce the play-free engagement of the first crown gearing 11 and second crown gearing 41 and accordingly to reach the final installation position illustrated on the right in FIG. 7 and in FIG. 6.

In the final installation position, the penetration of moisture and dirt from the outside into the joint between the first crown gearing 11 and the second crown gearing 41 is reliably prevented by means of the sealing ring 50, as a result of which the meshing engagement is protected against corrosion.

The arrangement of the sealing ring 50 with respect to the wheel hub 10 and the constant velocity joint 40 and the configuration thereof can be undertaken in various ways, as explained in more detail below. It should be noted that the arrangement of the sealing ring 50 and any engagement structures with respect to the constant velocity joint 40 as the first component and the wheel hub 10 as the second component can also be reversed in principle.

In one embodiment variant, as illustrated by way of example in FIGS. 6 to 8, the sealing ring 50 may be fixed to one of the first component and second component, while it is coupled to the other of the first and second component via a latching mechanism 511. By means of the latching, it can be reliably identified that the pre-assembly position has been reached, i.e. a tooth-on-tooth position is excluded.

The fixing of the sealing ring 50 to one of the first component and second component, here, by way of example, to the constant velocity joint 40 as the first component, can be undertaken by pressing it on, adhesively bonding it on or in some other way. Preferably, this is already done before the two components, namely the wheel hub 10 and the constant velocity joint 40, are joined together to achieve the pre-assembly position.

For the latching mechanism 511, latching lugs 512 can be formed on the sealing ring 50, said latching lugs being distributed on the circumference of the latter and, after overcoming a projection 101 on the other component, here, by way of example, the second component or the wheel hub 10, engaging in one or more recesses 102 on the other or second component.

A cross-sectional view of such a sealing ring 50 is illustrated in FIG. 9. Said sealing ring 50 here has three latching lugs 512 on its inner circumferential surface 513. However, the number of latching lugs 512 may also be smaller or larger than shown. Preferably, the number lies in a range of about 3 to 20.

Accordingly, the corresponding projection 101 and the corresponding recess 102 are located on an outer circumferential section of the second component. The projection 101 and the recess 102 can be designed as continuously peripheral structures, and therefore the angular position of the sealing ring 50 in the circumferential direction during installation is insignificant. However, it is also possible to provide the projection 101 by means of a plurality of individual projections and/or to provide the recess 102 by means of a plurality of individual recesses.

In a modification of the embodiments illustrated, however, the latching lugs 512 can also be arranged on an outer circumferential surface 514 of the sealing ring 50 instead of on the inner circumferential surface 513. Accordingly, the projection 101 and the recess 102 of the second component are then located on an inner circumferential section thereof.

As already mentioned, the latching lugs 102 in the unclamped state of the clamping device 60 are received with axial play in the recess or the corresponding recesses 102. Preferably, when the projection 101 is overcome by the latching lugs 512, the covering of the teeth of the first crown gearing 11 and the second crown gearing 41 is 30% to 90% of the tooth height thereof.

Instead of using latching lugs 512, the pre-fixing in the pre-assembly position can also be carried out in the same way as on the left in FIG. 7 via a sealing ring 50 which is slotted in this partial region. FIG. 10 correspondingly shows by way of example a further embodiment variant of the sealing ring 50, which is slotted at a plurality of points on the circumference. This makes it easier to clamp same to an outer circumferential section or to an inner circumferential section of the second component. The slots 515 are positioned in such a way that a sealing effect by means of the sealing ring 50 continues to be ensured. The number of slots 515 is shown as four in FIG. 10. However, similarly to the latching lugs 512, the number thereof may also be selected to be smaller or larger. The latching lugs 512 and the slots 515 are coordinated in such a way that the connection can reliably hold the dead weight of the components 10 and 40 to be joined together as well as the forces during the positioning of the clamping device 60.

To facilitate the installation, in particular when using a latching mechanism 511 with latching lugs 512, the sealing ring 50 may have a section 514 on which said latching lugs 512 are formed, which section is radially elastically inwardly and outwardly deflectable in order to more easily overcome a latching resistance formed by the projection 101.

For this purpose, chamfers formed on the latching lugs 512 and/or the projection 102 can also have a supporting effect.

Furthermore, the sealing ring 50 can have a peripheral sealing surface 516 which, in the clamped state of the clamping device 60, is pressed against a corresponding sealing surface 13 on the other component, here by way of example, the second component or the wheel hub 10.

The sealing surface 516 on the sealing ring 50 can be formed by an end-face wall section thereof, as shown in FIGS. 6 and 7.

In particular, as shown within the scope of the further exemplary embodiment according to FIG. 8, the peripheral sealing surface 516 on the sealing ring 50 and the corresponding sealing surface 13 on the other component can be conically formed.

Corresponding conical sealing surfaces 516 and 13 may, of course, also be provided in the further exemplary embodiments and furthermore by way of embodiment variants which are not illustrated. For example, the chamfer of the projection 101 in FIGS. 6 and 7 can serve as a contact surface for a corresponding oblique sealing surface additionally provided on the ring side.

The sealing ring 50 can be made entirely of plastic. Sensitive sealing lips can be avoided.

The above-explained sealing ring 50 of FIGS. 6 to 10 is additionally an installation aid for positioning the components 10, 40 to be joined while avoiding a tooth-on-tooth position. Joining to reach the pre-assembly position can be undertaken in a first step or working cycle. When the clamping device 60 is subsequently positioned and clamped in a second step or working cycle, no additional holding device is required for the respective second component in the present embodiment variants. The axial force applied during the clamping is of the order of magnitude of about 80 kN and more.

In one embodiment variant, it may be provided to design the holding force of the sealing ring 50 as an installation aid in such a way that an axial displacement to an end position is carried out using the clamping force of the clamping device 60.

Figure 11:
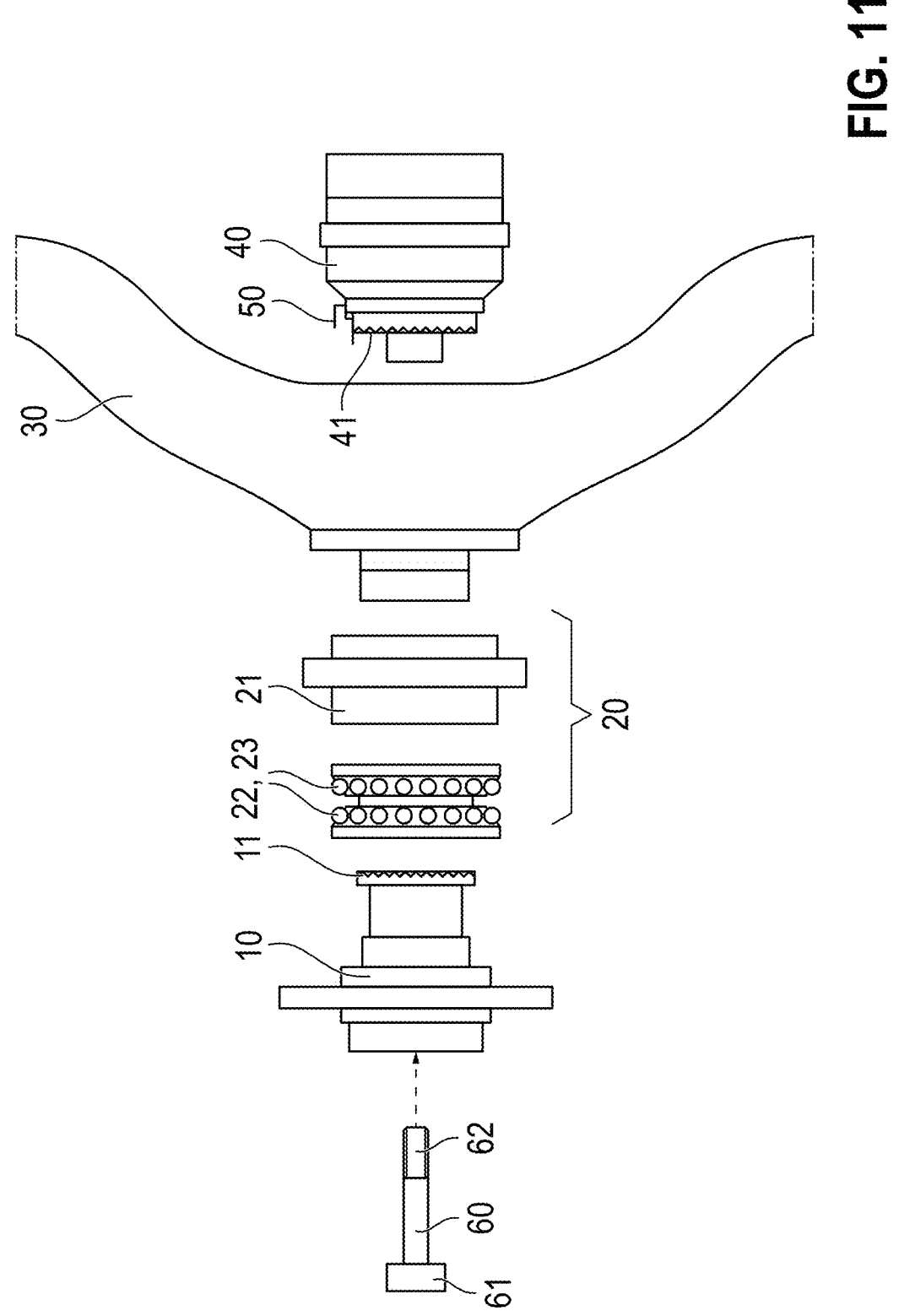
FIG. 11 shows an exploded illustration of a wheel bearing arrangement with a wheel carrier, a constant velocity joint and a wheel hub with wheel bearings, which are connectable to one another via an axially braced crown gearing arrangement.

As already mentioned above, the axially clamped crown gearing arrangement explained above can be used for connecting the constant velocity joint 40 to the wheel hub 10, together with the wheel bearing 20, as is illustrated by way of example with reference to an exploded illustration in FIG. 11. In this case, the first component is the constant velocity joint 40 and the second component is the wheel hub 10 with the wheel bearing 20, wherein the sealing ring 50 is fixed to the first component and fixed with the second component via the latching lugs 512 or in the region of the slots 515. However, it is also possible to install the sealing ring 50 the other way around, that is to say, to fix it to the second component or the wheel hub 10 with the wheel bearing 20 and to couple the region with latching lugs 512 or slots 515 to the first component or constant velocity joint 40. Corresponding recesses and projections can then be provided analogously on the first component or the constant velocity joint 40.

As in FIG. 11, the clamping device 60 can be formed by a clamping bolt, which is led centrally through the first crown gearing 41 on the constant velocity joint 40 and the second crown gearing 11 on the wheel hub 10 in order to axially brace the relevant components together.

Furthermore, a head 61 of the clamping bolt 60 can be supported on the wheel hub 10, while a threaded section 62 of the clamping bolt 60 is screwed into a threaded opening 43 on the constant velocity joint 40, preferably a joint bell thereof.

The sealing ring 50 provided as an installation aid, sealing means and wheel bearing pre-seal is fixed to an outer circumferential section of the constant velocity joint 40. Said sealing ring 50 is, as can be seen in FIGS. 6 to 8, coupled to corresponding mating structures on the wheel hub 10 and/or the wheel bearing 20, here in particular on a bearing inner ring 29.

FIG. 6 shows, by way of example, a variant in which the above-mentioned projection 101 and the above-mentioned recess 102 are formed on the bearing inner ring 29 of the wheel bearing 20. In particular, the sealing ring 50 can be latched here to the bearing inner ring 29 and can be sealed against the latter.

In FIG. 6, a corresponding sealing surface of the sealing ring 50 is supported on a corresponding wall section of the bearing inner ring 29. In particular, the sealing surface can be pressed against the corresponding wall section of the bearing inner ring 29 during installation in order to improve the sealing effect.

In a modification thereof, as shown by way of example in FIG. 7, in the clamped state of the clamping bolt 60, the sealing ring 50 can be pressed axially against a section of the wheel bearing seal 25 of the wheel bearing 20 and seal against it. In this case, the section of the wheel bearing seal 25 against which the sealing ring 50 is supported is fixed to the bearing inner ring 29 of the wheel bearing 20, optionally also to the wheel hub 10, in order to avoid a relative movement between the section of the wheel bearing seal 25 and the sealing ring 50 during operation.

Furthermore, it is possible, as shown in FIG. 8, to form mating structures for the coupling of the sealing ring 50 directly to the wheel hub 10 independently of the presence of a bearing inner ring 29 of the wheel bearing 20. In the embodiment variant according to FIG. 6, a projection 101, a recess 102 and a sealing surface 13 are correspondingly formed directly on the second component, which forms the wheel hub 10.

Finally, one possible method for joining a wheel bearing arrangement of the type explained above will be briefly described.

During the installation, the sealing ring 50 can first of all be fixed to the first component or the constant velocity joint

40. The first component 10 or the constant velocity joint 40 is thus supplied, already provided with the sealing ring 50, to the joining process.

Furthermore, the wheel bearing 20 is mounted on the wheel hub 10 and the wheel bearing 20 in turn is connected to the wheel carrier 30.

In a further step of the joining process, the constant velocity joint 40 and the wheel hub 10 with the wheel bearing 20 are loosely mounted on each other using the sealing ring 50. The first crown gearing 11 and the second crown gearing 41 enter into partial engagement such that their teeth already overlap, but a play-free position is not yet reached. In this pre-assembly position, the wheel hub 10 is fixed in relation to the axle stub 40 or constant velocity joint, and therefore the two components can no longer be easily detached from each other, but at the same time it is prevented that their crown gearings 11 and 41 are in a tooth-on-tooth position on each other. Such a process step is easy to handle.

In a subsequent step, bracing of the first crown gearing 11 and the second crown gearing 41 against each other is undertaken using the clamping bolt 60. Since the wheel hub 10 is already pre-fixed in relation to the constant velocity joint 40, no additional holding device has to be provided for the wheel hub when positioning and screwing the clamping bolt 60. The screwing causes the first crown gearing 11 and the second crown gearing 41 to butt against each other without play. The corresponding bracing is selected depending on the torques to be transmitted. This process step is also easy to handle. When the installation position is reached, the sealing ring 50 radially outwardly seals the engagement of the first crown gearing 11 with the second crown gearing 41, i.e. is converted from an installation aid to a sealing device. At the same time, the sealing ring 50 enters into engagement with the wheel carrier 30 to provide the pre-sealing for the wheel bearing 20.

Optionally, the encapsulation of the constant velocity joint described in connection with FIGS. 3 and 4 can also be carried out, and, optionally, a targeted water drain can be provided according to FIG. 5.

The axially braced crown gearing arrangement is removable, in particular is removable without being damaged. This is of advantage for customer service.

For this purpose, for example, the latching mechanism 511 can be designed such that a release of the latching lugs 512 is possible by a high axial force or a bending moment. Correspondingly adapted contact slopes or chamfers can be provided for this purpose.

Similarly, when using slots 515 for the clamping, the clamping force can be set in such a way that it is possible for release to take place by overcoming the clamping force.

A removal method, for example for customer service, can proceed in a simple way as follows. The clamping device 60 is initially slightly loosened for this purpose, preferably in such a way that a partial engagement of the crown gearings 11 and 41 is maintained. For example, a clamping bolt can be loosened by approx. 3 to 9 mm (corresponding to 2 to 6 revolutions with a thread pitch of 1.5 mm). The head 61 of the clamping bolt is struck with a soft-faced hammer until the sealing ring 50 loosens in the region of the latching mechanism 511 or the slots 515. Falling of the constant velocity joint 40 can be prevented by the clamping bolt not yet being completely released. After loosening of the sealing ring 40, the clamping device 60, or the clamping bolt, can be unscrewed completely.

The invention has been explained in more detail above with reference to exemplary embodiments and further modifications. In particular, individual technical features, which have been explained above in the context of further individual features, can be realized independently thereof and in combination with other individual features, even if this is not expressly described, as long as this is technically possible. The invention is therefore expressly not limited to the described exemplary embodiments and modifications, but comprises all the embodiments defined by the claims.

The following is a summary list of reference numerals and the corresponding structure used in the above description of the invention:

10 Wheel hub
11 First crown gearing
12 End wall
13 Sealing surface
20 Wheel bearing
21 Wheel bearing outer ring
22 Rolling bearing
23 Rolling bearing
24 Wheel bearing seal
25 Wheel bearing seal
26 Supporting and fastening structure
29 Bearing inner ring
201 Projection
202 Recess
30 Wheel carrier
31 Projection
32 Axial annular wall
33 Inner edge of the projection
34 Annular groove of the projection
35 Inner edge of the annular groove
40 Axle stub or constant velocity (CV) joint
41 Second crown gearing
42 Wall shoulder
43 Threaded opening
50 Sealing ring
51 Sleeve-shaped first sealing section
52 End face
53 End face
55 Outer edge
56 Step
57 Sleeve-shaped second sealing section
58 Annular groove on the sealing ring
59 Sleeve-shaped third sealing section
60 Clamping device
61 Head
62 Thread/threaded section
70 Sealing element of the constant velocity joint
71 Expansion bellows
72 Sheet metal cap
101 Projection
102 Recess
501 Radial rib
502 Cell
503 Retaining wall
504 Axial wall section
505 Peripheral outer circumferential wall section
506 First fastening section
507 Second fastening section
508 Latching mechanism
509 Support web
510 Peripheral inner circumferential wall section
511 Latching mechanism
512 Latching lug
513 Inner circumferential surface
514 Outer circumferential surface
515 Slot

19

516 Sealing surface
517 Section
h Tooth height
x Axial play
A Axis—corresponding to the axis of rotation of the wheel hub, axle stub, and sealing ring
S Flow

The invention claimed is:

1. A contact-free wheel bearing pre-seal between a wheel carrier and at least one of a wheel hub, a wheel bearing, or an axle stub, the contact-free wheel bearing pre-seal comprising:
a sealing ring fixed to at least one of the wheel hub, the wheel bearing, or the axle stub and forming a sealing gap with a mating contour located on the wheel carrier or on a component fastened to the wheel carrier;
said sealing ring having radial webs and cells formed between said radial webs; and
a retaining wall delimiting said cells radially outwardly and delimiting said sealing gap radially inwardly, and, when said sealing ring rotates, a flow opposed to the breaching of the seal is generated in front of and/or in said sealing gap.

2. The contact-free wheel bearing pre-seal according to claim 1, wherein said radial webs and said cells are formed on said sealing ring on an outside of the seal.

3. The contact-free wheel bearing pre-seal according to claim 1, wherein said radial webs and said cells are formed on said sealing ring on an inside of the seal.

4. The contact-free wheel bearing pre-seal according to claim 1, wherein said sealing ring is formed with radial webs arranged on an axial wall section of said sealing ring.

5. The contact-free wheel bearing pre-seal according to claim 4, wherein said axial wall section of said sealing ring extends in a plane perpendicular to an axis of rotation of said sealing ring.

6. The contact-free wheel bearing pre-seal according to claim 4, wherein said axial wall section of said sealing ring has an annular surface perpendicular to an axis of rotation of said sealing ring.

7. The contact-free wheel bearing pre-seal according to claim 4, wherein a height of said radial webs, defined by an extent thereof in an axial direction of said sealing ring from said axial wall section, increases radially outward.

8. The contact-free wheel bearing pre-seal according to claim 1, wherein said retaining wall of said cells are formed by a peripheral outer circumferential wall section of said sealing ring.

9. The contact-free wheel bearing pre-seal according to claim 8, wherein said radial webs, at radially outer ends thereof, end axially with said peripheral outer circumferential wall section.

10. The contact-free wheel bearing pre-seal according to claim 1, wherein said sealing ring has at least one of a first fastening section for fixing to the axle stub or a second fastening section for fixing to at least one of the wheel hub or the wheel bearing.

11. The contact-free wheel bearing pre-seal according to claim 10, wherein said second fastening section is a sleeve section of said sealing ring, said sleeve section on an inside of the seal axially adjoining an axial wall section of said sealing ring.

12. The contact-free wheel bearing pre-seal according to claim 11, wherein said sleeve section, at a free end thereof facing away from said axial wall section, is formed with a latch configured for latching to corresponding structures on the wheel hub and/or on the wheel bearing.

13. The contact-free wheel bearing pre-seal according to claim 11, wherein said sleeve section of said second fastening section is axially supported against said axial wall section radially on an inside via support webs, which extend radially inward from the sleeve section.

14. The contact-free wheel bearing pre-seal according to claim 13, wherein said sealing ring has a peripheral inner circumferential wall section, which has said first fastening section radially on an inside and on which said support webs are supported on an outside.

15. A wheel bearing arrangement, comprising:
a wheel hub;
a wheel carrier;
a wheel bearing for rotatably supporting said wheel hub on said wheel carrier;
an axle stub coupled to the wheel hub; and
the contact-free wheel bearing pre-seal according to claim 1 disposed between said wheel carrier and at least one of said wheel hub, said wheel bearing, or said axle stub;
the sealing ring of said contact-free wheel bearing pre-seal being rotationally fixed to at least one of said wheel hub, said wheel bearing, or said axle stub.

* * * * *